Oct. 27, 1964   R. V. THOMPSON ET AL   3,154,325
EXTENSIBLE IMPLEMENT TONGUE
Filed June 18, 1963

INVENTORS
ROGER V. THOMPSON
DONALD T. THOMPSON
BY
Merchant, Merchant & Gould
ATTORNEYS

United States Patent Office 3,154,325
Patented Oct. 27, 1964

3,154,325
EXTENSIBLE IMPLEMENT TONGUE
Roger V. Thompson and Donald T. Thompson, both of Rte. 1, Whitehall, Wis.
Filed June 18, 1963, Ser. No. 288,796
5 Claims. (Cl. 280—478)

Our invention relates generally to means for attaching power-equipped tow vehicles to trailer vehicles adapted to be towed thereby.

More particularly our invention relates to means for detachably securing tongue-equipped agricultural wagons and the like to drawbar-equipped tractors.

The primary object of our invention is the provision of a novel tongue for agricultural wagons or other draft implements which may be extended within limits, when desired, so as to enable the driver of a tractor to back the tractor to a point where the drawbar of the tractor is in approximate overlying relationship to the forward end of said tongue, dismount from said tractor and manually attach the tongue to the drawbar, by extending the drawbar and without moving either the wagon or tractor, and thereafter remount the tractor and retract the drawbar to its operative position, wherein it automatically locks itself, by imparting slight reverse movements to the tractor.

A further object of our invention is the provision of a device of the class immediately above described wherein means is provided for temporarily rendering the tongue extensible, with a minimum of effort and with a maximum of certainty.

A further object of our invention is the provision of a device of the class above described which incorporates a minimum of working parts and may be manufactured and sold at a relatively low figure.

A further object of our invention is the provision of a device of the class above described which is rugged and durable in construction and foolproof in operation.

The above and still further objects of our invention will become apparent from the following detailed specification, appended claims and attached drawings.

Referring to the drawings wherein like characters indicate like parts throughout the several views.

Figure 1:
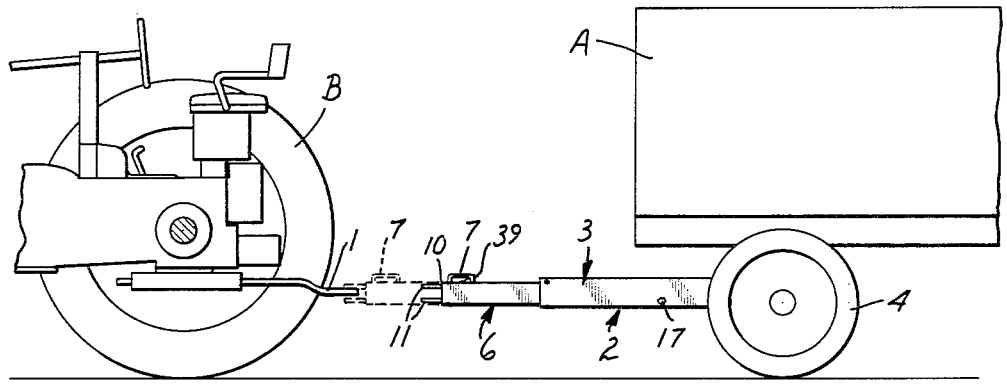
FIG. 1 is a view in side elevation of a conventional farm wagon showing our novel tongue attached thereto.

Referring with greater particularity to the drawings, the farm wagon shown in FIG. 1 is identified by A and the tractor by B. Tractor B is provided with the customary rearwardly projecting generally horizontally disposed drawbar 1; whereas wagon A is provided with a tongue 2 constructed in accordance with our invention.

Tongue 2 includes a primary section 3 adapted to be secured at its rear end to the wagon A through the medium of an axle, not shown, and project forwardly therefrom intermediate the front wheels 4. Tongue section 3 is preferably tubular in nature and has a mouth-forming open front 5. Telescopically slidably received within the primary section 3 and projecting forwardly therefrom through the mouth 5 is a secondary tongue section 6 which, as shown, is provided with an inverted generally U-shaped handle 7 which projects upwardly from the top wall 8 thereof intermediate the opposite side walls 8a, and which extends longitudinally of the axis thereof. Secondary tongue section 6 is likewise shown as being tubular whereby to define an axially extended passage 9. At its extreme forward end 10 the secondary section 6 is provided with vertically spaced forwardly projecting hitching ears 11 having vertically aligned apertures 12 therein for reception of a pin, not shown, but adapted to be received therein through an aperture, not shown, in the drawbar 1.

Figure 3:
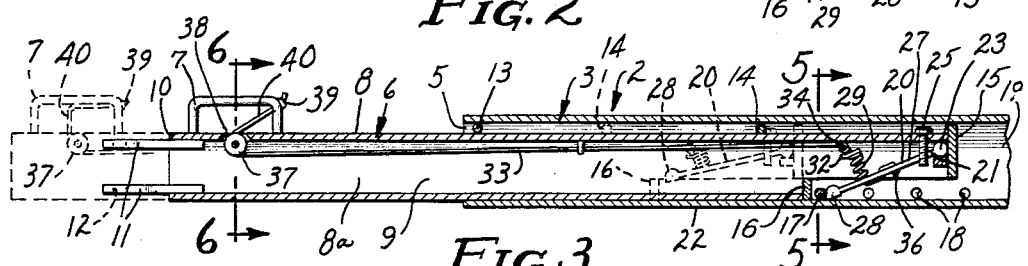
FIG. 3 is a view in section taken substantially on the line 3—3 of FIG. 2.

As shown particularly in FIG. 3, the primary tongue section 3 adjacent its mouth 5 is provided with a depending stop pin 13 adapted to engage an upstanding stop lug 14 carried by the top wall 8 of the secondary tongue section 6 intermediate its front and rear ends 10, 15, respectively, whereby to prevent accidental detachment of said sections during extending movements of the former with respect to the latter. However, pin 13 may be removed when and if it becomes necessary or desirable to remove section 6 from section 3 for repairs and so forth. Retracting movements of the secondary tongue section 6, with respect to the primary section 3, are limited by engagement of a shoulder 16 formed in the lower portion of the former in axially outwardly spaced relation to the rear end 15 thereof, and a horizontally disposed strike element 17 which is also in the nature of a pin selectively receivable within longitudinally spaced transversely aligned apertures 18 in the side walls 19 of the latter. In this manner the degree of retraction of the secondary tongue section 6 with respect to the primary tongue section 3 may be varied, as desired.

Figure 2:
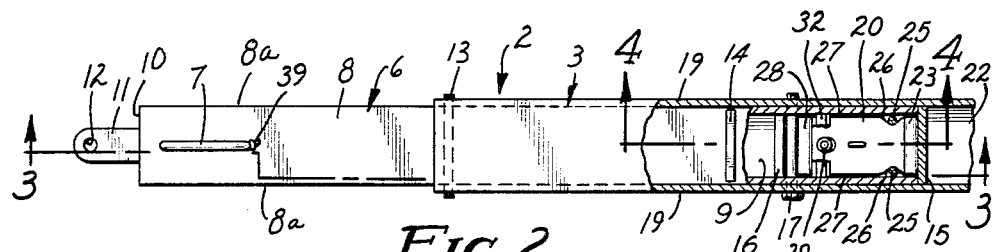
FIG. 2 is a greatly enlarged view in top plan, some parts being broken away and some parts shown in section.
Figures 4, 5:
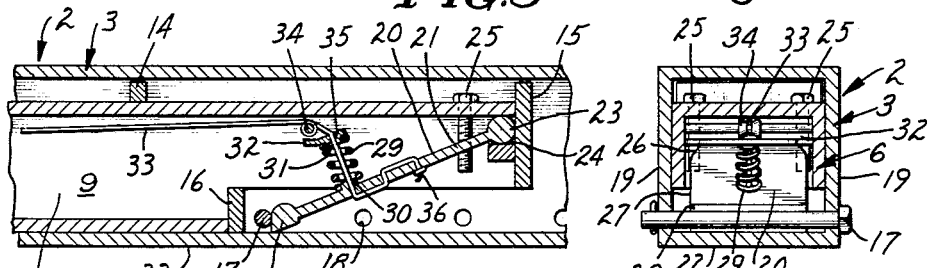
FIG. 4 is a fragmentary sectional view taken on the line 4—4 of FIG. 2, on an enlarged scale.
FIG. 5 is a view in section taken on the line 5—5 of FIG. 3.
Figure 6:
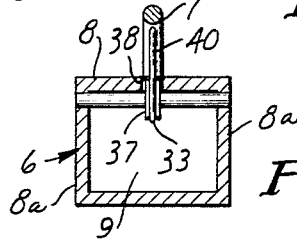
FIG. 6 is a view in section taken on the line 6—6 of FIG. 3.

Automatically latching the secondary tongue section 6 in a selected retracted position is an axially elongated latch element 20, shown particularly in FIGS. 2 and 5 as being plate-like in nature. Pivotally securing the rear end portion 21 of the latch 20 above the plane of the bottom wall 22 and the strike element 17 which overlies said bottom wall 22, is an enlarged cross-sectionally generally circular boss 23 which is snugly received within a forwardly opening transversely extended recess 24 formed in the rear end portion of the secondary section 6. Retaining the boss 23 within the recess 24 are a pair of laterally spaced screw-threaded pins 25 which depend from the upper wall 8 of the secondary section 6 and have their intermediate portions slidably received in transversely opposed notches 26 formed in opposite side edges 27 of the plate-like latch element 20.

Yieldingly biasing the latch element 20 toward engagement of its forwardy and downwardy tapering front end portion 28 with the bottom wall 22 of the primary section 3, whereby to cause engagement between elements 28 and 17 upon forward movements being imparted to the secondary tongue section 6, is a coil compression spring 29. Spring 29 at its lower end snugly encompasses an upstanding boss 30 on the longitudinal intermediate portion of the latch element 20, and at its upper end encompasses a similar boss 31 formed on a transverse anchoring bracket 32 carried by the side walls 8a of said secondary section 6.

Referring particularly to FIGS. 3 and 4, it will be noted that the longitudinal spacing between the front end portion 28 of the latch element 20 and the stop shoulder 16 is sufficiently greater than the transverse dimension of the strike pin 17 to allow sufficient movement of the section 6 within the primary section 3 to positively insure raising of the latch element 20 from the full line operative position of FIG. 3 to the inoperative dotted line position thereof.

To enable the operator to raise the latch element from its operative full line position of FIG. 3 to the inoperative dotted line position thereof, so as to permit the operator to extend the secondary section 6 with respect to the primary section 3 for attachment of the same to the drawbar 1 of a tractor B, we provide a latch releasing cable 33, the intermediate portion of which is received within the passage 9. As shown, the rear end portion of the cable 33 extends over a guide roller 34 above the plane of the bracket 32, through an aperture 35 in said bracket 32, through the axis of said coil spring 29, through an aperture in the intermediate portion of the latch element 20, and finally is anchored to the latch element 20 as at 36. On the other hand, the forward end portion of the cable 33 extends over a guide roller 37 within the passage 9, upwardly through an opening 38 therein, and finally is secured to the handle 7, as at 39, so as to position the portion 40 in the same vertical plane as the handle 7. It should be readily visualized that as an operator wraps his hand about the handle 7 for purpose of elevating it to cause engagement between the ears 11 and the drawbar 1, that his fingers may, if desired, simultaneously engage the portion 40 of the cable 33, whereby the latch element 20 will be raised from its full line position of FIG. 3 to the dotted line position thereof, thus permitting any degree of extension required, to the point of engagement of the stop elements 13, 14.

After interlocking engagement is caused between the ears 11 and the drawbar 1, the driver may again remount the tractor and impart slight rearward movements thereto whereby to cause engagement of the shoulder 16 with the preset stop pin 17. Obviously, during such retracting movements the latch element 20 cams itself over the strike element 17 against the yielding bias of the spring 29 and finally comes into engagement with the bottom wall 22.

Our invention has been thoroughly tested and found to be completely satisfactory for the accomplishment of the above objects, and while we have shown a preferred embodiment thereof, we wish it to be understood that same may be capable of modification without departure from the scope and spirit of the appended claims.

What is claimed is:

1. A tongue for detachable connection between a vehicle to be towed and the drawbar of a towing vehicle, said improvements comprising:
   (a) a primary tongue section adapted to be secured at its rear end to the vehicle to be towed and having a tubular front end portion,
   (b) a secondary tongue section telescopically slidably received within the front end of said primary section for extending and retracting movements,
   (c) stop means limiting extending movements of said secondary tongue section with respect to said primary section,
   (d) stop means limiting retracting movements of said secondary tongue in said primary tongue section and including a strike element carried by said primary section and a shoulder defined by said secondary tongue section,
   (e) releasable means automatically latching said secondary section in its retracted position,
   (f) said last-mentioned means comprising an elongated latch element carried by said secondary tongue section and having one end thereof pivotally secured thereto for swinging movements of the other end thereof toward and away from a position to engage said strike element upon initial extending movements of said secondary tongue section,
   (g) yielding means biasing said latch element toward a position to cause engagement of said other end with said strike element upon initial extending movements of said secondary tongue section,
   (h) and a releasing cable secured to the intermediate portion of said latch element for raising said other end of said latch element away from a position to engage said strike element and against the bias of said yielding means,
   (i) said cable extending forwardly through a passage in said secondary tongue section and having its forward end secured to the exterior thereof,
   (j) said strike element overlying the bottom wall of said primary section,
   (k) and said latch element is pivotally secured at its rear end on a horizontal axis above the level of said strike element for lowering and raising movements of the front end thereof toward and away from engagement with the bottom wall of said primary tongue section whereby to cause engagement of said front end with said strike element upon initial extending movements of said secondary section.

2. The structure defined in claim 1 in which said yielding means comprises a generally upright coil compression spring the lower end of which engages the intermediate portion of said latch element, said cable extending upwardly through said coil compression spring and being entrained over a guide above the level thereof.

3. The structure defined in claim 2 in which said strike element is in the nature of a horizontally disposed latch pin which is adapted to be selectively received within longitudinally spaced transversely aligned apertures in the side walls of said primary tongue section, whereby to effectively vary the operative length of said tongue sections.

4. The structure defined in claim 2 in which said secondary tongue section adjacent its forward end is provided with an inverted generally U-shaped longitudinally extended lifting handle, the forward end of said cable being guided through an opening in the forward end of said secondary tongue section intermediate the opposite ends of said handle and being anchored to said handle in a manner to be engaged if desired by a hand in engagement with said handle, whereby to raise the forward end of said latch element out of engagement with said strike element.

5. The structure defined in claim 4 in which the spacing between the forward end of said latch element when same is in engagement with the bottom wall of said primary tongue section and the stop shoulder defined by said secondary tongue section is greater than the transverse dimension of said strike element, whereby to permit limited retracting and extending movements of the secondary tongue section to insure raising of the latch element.

References Cited in the file of this patent

UNITED STATES PATENTS

| | | |
|---|---|---|
| 2,366,294 | Stringer | Jan. 2, 1945 |
| 2,384,244 | Forney | Sept. 4, 1945 |
| 2,397,964 | Hiniker | Apr. 9, 1946 |
| 2,415,479 | Forney | Feb. 11, 1947 |
| 2,685,456 | Black | Aug. 3, 1954 |
| 2,794,657 | Anderson | June 4, 1957 |